Figure 1:
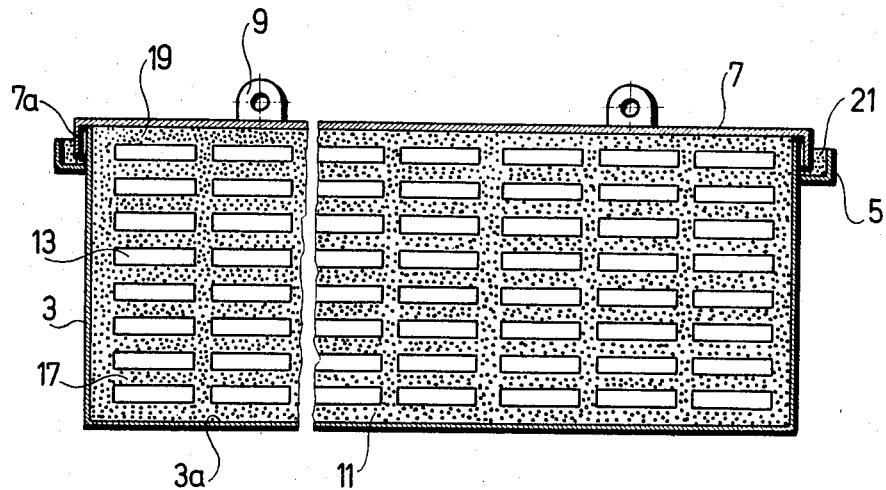

United States Patent
Sandor et al.

[15] 3,689,615
[45] Sept. 5, 1972

[54] METHOD OF IMPROVING REFRACTORY BRICKS

[72] Inventors: Miklos Sandor; Istvan Nyitray, both of Borsodnadasd; Jozsef Nemeth, Budapest, all of Hungary

[73] Assignee: Borsodnadasdi Lemezgyar, Borsodnadasd, Hungary

[22] Filed: Jan. 4, 1971

[21] Appl. No.: 103,673

[52] U.S. Cl. ............... 264/60, 117/107.2 P, 117/123, 264/65
[51] Int. Cl. ............................................. C04b 41/06
[58] Field of Search ...... 264/60, 65, 82; 117/107.2 P, 117/123, 138

[56] References Cited

UNITED STATES PATENTS

| | | | |
|---|---|---|---|
| 3,096,160 | 7/1963 | Poyear | 117/107.2 P X |
| 3,096,205 | 7/1963 | De Gvisto | 117/107.2 P |
| 3,257,230 | 6/1966 | Wachtell et al. | 117/107.2 P |
| 2,667,427 | 1/1954 | Nolte | 264/65 X |

FOREIGN PATENTS OR APPLICATIONS 337,118   4/1959   Switzerland

*Primary Examiner*—Donald J. Arnold
*Assistant Examiner*—David A. Jackson
*Attorney*—Young & Thompson

[57] ABSTRACT

Heat and wear resistance and other properties of refractory bricks are improved by embedding them in a special powder and heating them in an oxygen-free atmosphere at 900°–1,100° C. for 18–36 hours. The powder is prepared by heating bauxite powder slowly to 950°–1,100° C. and keeping it there for 10–15 hours, then cooling and comminuting the powder and admixing 40–60 percent by weight of it with 40–60 percent by weight of powdered aluminum and 1–6 percent by weight of powdered ammonium chloride, then annealing this intermediate powder at 950°–1,100° C. for 22–26 hours, cooling and comminuting and admixing 10–20 percent by weight powdered aluminum and 0.5–3 percent by weight powdered aluminum chloride.

1 Claim, 2 Drawing Figures

METHOD OF IMPROVING REFRACTORY BRICKS

This invention relates to a method of improving refractory bricks made of conventional basic materials so as to increase their resistance to heat, wear, acids etc. as well as their quenching capacity.

Refractory materials conventionally employed in industry and metallurgy are divided in three groups according to their heat resistances. The first group comprises materials of "little" heat resistance having a melting point of 1,580° to 1,650° C. The second group is formed by materials of "good" heat resistance the melting point of which is 1,670° to 1,730° C. Finally, materials of "very good" heat resistance and of a melting point of 1,750° to 2,000° C. form the third group.

The properties and, thereby, also the heat resistance of refractory bricks are actually defined by the composition and the quality of the basic material of which they are produced. Therefore, the quality of the bricks could be altered either by a suitable selection of the raw materials or—between well defined narrow limits—by the manner and the extent of burning out, or both. However, alteration of quality by selection of the basic materials is not practically feasible because a basic material chosen for meeting certain quality requirements may, naturally, unfavorably influence other qualities of the bricks. Furthermore, it has been suggested to apply various treatments to the surface of the bricks by which, however, the basic manner of production is not altered. Such surface treatment is disclosed e.g., in Swiss Pat. No. 337,118.

The main object of the present invention is to produce a refractory brick from known and conventional basic materials which is distinguished by improved acid resistance, its wear resistance being over the whole cross-sectional area of the brick higher than corresponding values of the best known refractory bricks while its quenching capacity is a multiple of the value characteristic of known bricks.

According to the invention, this object is achieved by a method comprising the steps of heating a bauxite powder at a rate of 20° to 50° C. per hour to a temperature of 950° to 1,100° C., keeping it at such temperature for 10 to 15 hours, cooling it to room temperature and, eventually, grinding and sieving it through a sieve of a mesh size of 0.4 to 1 millimeter, repeating such treatment preferably three times, admixing with 40 to 60 percent by weight of bauxite powder an amount of 60 to 40 percent by weight of aluminum powder and an amount of 1 to 6 percent by weight of ammonium chloride, mixing the mixture so as to obtain a homogeneous intermediate powder, annealing said intermediate powder at a temperature of 950° to 1,100° C. for 22 to 26 hours, cooling it down, sieving and grinding it so as to obtain a basic powder, admixing an amount of 10 to 20 percent by weight of aluminum powder and an amount of 0.5 to 3 percent by weight of aluminum chloride with said basic powder and mixing the mixture so as to obtain a homogeneous active powder, and eventually embedding refractory mouldings in the active powder and reacting them therewith in an oxygen-free atmosphere at a temperature of 900° to 1,100° C. for 18 to 36 hours.

It is believed that introducing a metal and/or a metal alloy into a non-metallic refractory material in an oxygen-free atmosphere in the form of metal atoms and preferably originating from the decomposition of a corresponding metal chloride is responsible for the desired effect. However, the introduction of a metal and/or a metal alloy into the non-metallic refractory material by diffusion requires the presence of a catalyst. Preferably, non-metallic burned out powders enriched with the respective metal and, at the same time, a chloride which is preferably ammonium chloride will be employed as catalysts.

The thickness of the layer of active powder in which the refractory mouldings are embedded will be at least 30 millimeters, the mutual distance of the mouldings being likewise at least 30 millimeters. The interstices between the shaped bodies will be filled with active powder and then the whole staple of layers and mouldings will be covered with a layer of active powder, such layer having a thickness of at least 30 millimeters and preferably 50 millimeters.

Figure 2:
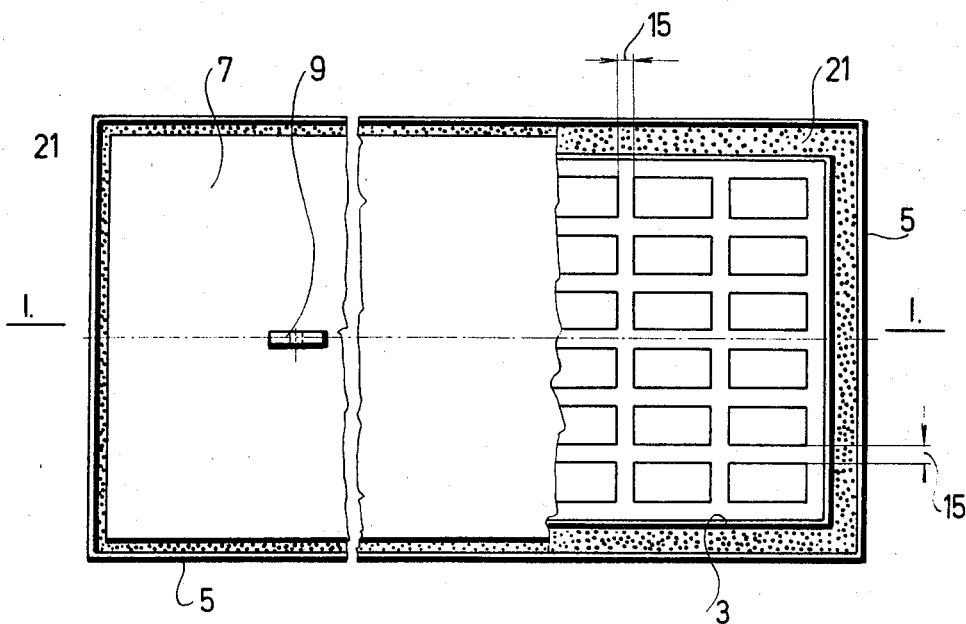

Further details of the invention will be described in connection with the manufacture of fire clay bricks treated with aluminum by reference to the accompanying drawing, in which:

FIG. 1 is a longitudinal sectional view along the line I-I of FIG. 2, showing a group of bricks undergoing treatment according to the present invention; and FIG. 2 is a plan view of FIG. 1 partly in section.

First, the active powder is prepared in the following manner:

raw bauxite having a content of at least 50 percent of $Al_2O_3$ is separated from refuse and a layer of it of a thickness of about 300 millimeters is annealed in an open container, a thorough mixing being carried out in about each half hour.

Such bauxite powder will be subjected to three heat treatments:

first, an annealing container filled with bauxite will be heated at a rate of 30° C. per hour to a temperature of 1,100° C. and kept at such temperature for about 10 hours. Then, the bauxite will be cooled down first in the container to 600° C. and eventually in open air to room temperature. The cooled down bauxite will be ground and—by means of a sieve of a mesh size of 0.5 millimeter—sieved.

Then, the bauxite powder will again be annealed, the rate of heating being 50° C. per hour and the time of keeping it at a temperature of 1,100° C. will be 5 hours. Thereafter, cooling down and sieving take place as previously described.

This treatment is repeated once more.

Then, a homogeneous intermediate powder mixture consisting of 60 percent by weight of annealed bauxite powder having a mesh size of 0.5 millimeter, 7 percent by weight ammonium chloride and 38 percent by weight metallic aluminum powder of a mesh size of 0.5 to 1 millimeter is thoroughly mixed by means of a drum mixer.

The homogeneous intermediate powder mixture is placed in a sealed annealing container. The lid of the container is sealed by means of a fire clay closure in a manner to be described hereinafter. The container is heated at a rate of 150° C. per hour to a temperature of 1,050° C. After keeping it at such temperature for 24 hours, the powder is cooled down in the already described manner. The annealed powder mixture is removed from the container and its lumpy parts disintegrated whereafter the entire powder mixture is sieved through a sieve of a mesh size of 1 millimeter. In this way a basic powder mixture is obtained.

Ten to 15 percent by weight of metallic aluminum of a purity of 99.5 percent, and 0.5 percent aluminum chloride are admixed with the basic powder mixture. In order to obtain a homogeneous active powder mixture the materials are thoroughly mixed in a drum mixer. A charge of 100 kilograms, for example, will be mixed for about ten minutes.

By now, the active powder necessary for carrying out the method of improving the qualities of ceramic mouldings, more particularly of refractory bricks, is ready.

The method itself is preferably carried out in an annealing container 3 the upper rim of which has a channel 5 within which is received the downwardly extending rim 7a of a lid 7. The side walls of the container 3 have steel bands, not shown, welded to them which serve for fixing the lid 7 onto the container 3. Reference numeral 9 designates lugs by means of which the lid 7 may be manipulated.

In operation, the lid 7 is removed by means of the lugs 9 from the container 3 the bottom 3a of which has a layer 11 of active powder placed on it, the thickness of the layer being at least 30 millimeters. The mouldings such as refractory bricks 13 to be treated are arranged on the powder layer 11 in such a manner that on each side thereof there remains an interstice of the thickness of the layer 11. Such arrangement is followed by a continuous layer 17, and so on. Thus the container 3 will be filled with bricks 13 embedded in active powder and separated from one another both horizontally and vertically. The uppermost layer 19 again consists of active powder and may have a thickness which is somewhat greater, e.g., 50 millimeters, than the other continuous layers mentioned hereinbefore. Obviously, even the refractory bricks 13 in the top layer are surrounded by active powder on all sides.

Before putting on the lid 7, the channel 5 will be filled by fire clay mortar. When preparing the mortar, the highly hygroscopic nature of the active powder should be taken into consideration. If too much moisture of the fire clay mortar is permitted to be bound by the active powder, the latter will be hard at the surface after annealing, which may cause difficulties when removing the bricks.

With the channel 5 filled with fire clay mortar, the lid 7 is put on and pressed down by weights. Care should be taken that the lid 7 occupies its exact position in the channel 5. Thereafter, the lid 7 is secured by means of the steel bands (not illustrated) whereby the container 3 with its charge is prepared for being annealed in a furnace.

When the container 3 is brought into the furnace on a sledge, care should be taken that the bottom part 3a of the container 3 does not entirely rest on the sledge so that a uniform heat absorption be obtained. Prior to placing such containers 3 into the annealing furnaces it is preferable to preheat the furnace to a temperature which is by about 100° C. higher than the desired temperature of heat treatment since then heat absorption is more vigorous.

Temperature of annealing and duration of keeping at such temperature depend on the dimensions of the mouldings. The following values will preferably be used:

| Thickness of Layer in Millimeters | Temperature in °C. | Time at Temperature in Hours |
| --- | --- | --- |
| 20 | 980 | 18 |
| 30 | 1000 | 20 |
| 40 | 1050 | 28 |
| 60 | 1100 | 36 |

In the following table the corresponding preferred values for three different exemplified embodiments are set forth:

| Nature of value | Examples I | II | III |
| --- | --- | --- | --- |
| Rate of heating (degrees centigrade per hour) | 20 | 35 | 45 |
| Annealing temperature (degrees centigrade) | 960 | 1050 | 1080 |
| Duration of annealing (hours) | 12 | 13 | 14 |
| Mesh size (millimeters) | 0.6 | 0.7 | 0.9 |
| Bauxite powder (% by weight) | 45 | 50 | 55 |
| Aluminum powder (% by weight) | 53 | 47 | 42 |
| Chloride (% by weight) | 2 | 3 | 3 |
| Duration of annealing of intermediate powder (hours) | 21 | 24 | 25 |
| Annealing temperature of intermediate powder (degrees centigrade) | 970 | 1080 | 1090 |
| Addition of aluminum powder to basic powder (% by weight) | 12 | 15 | 18 |
| Addition of chloride to basic powder (% by weight) | 1 | 2 | 3 |
| Reaction temperature of active powder and mouldings (degrees centigrade) | 950 | 1030 | 1090 |

After annealing, the heating of the furnace is discontinued and the container 3 cooled down in the furnace to a temperature of about 600° C. with the doors of the furnace closed. Thereafter, cooling down is carried out in open air. In order to accelerate cooling down, the lid 7 of the container 3 may be removed. With the lid 7 on, the complete cooling down takes much longer, as the conductivity of the active powder mixture is very low.

After the container 3 has cooled down, the channel 5 is cleansed of fire clay mortar 21 and the lid 7 of the container 3 removed. The active powder which clings to the surface of the bricks is removed mechanically. The powder mixture remaining in the container 3 is sieved by means of a vibration sieve and prepared in the already described manner for being used again.

With the method according to the invention, a plurality of chemical reactions takes place. The employed ammonium chloride is converted at a temperature of 350° to 400° C. to its gaseous phase wherein it disintegrates into ammonia and hydrochloric acid:

$$NH_4Cl = NH_3 + HCl$$

The ammonia expels the air from the container whereby the fire clay seal becomes tight and an oxygen-free atmosphere is established. At the same time, the hydrochloric acid reacts with the metallic aluminum:

$$6 HCl + 2 Al = 2 AlCl_3 + H_2$$

Thus, a finely distributed aluminum chloride is formed which reacts with the metallic component of the heat-treated mouldings:

$$Me\ III + Al\ Cl_3 = Al + Me\ Cl_3$$

for example $$Fe + AlCl_3 = FeCl_3 + Al$$

(here, $Fe^{+++}$ is present in a compound or in the form of an oxide).

The aluminum which, thus, is formed "in statu nascendi" diffuses into the mouldings.

Employment of the method according to the invention has the advantage of the aluminum being diffused along the whole cross-sectional area of the treated mouldings and oxidizing at high temperature when exposed to wear so that an $AlO_3$ layer (actually a corundum layer) is constantly renewed by the aluminum which reacts with the non-metallic material and with the oxygen of the air.

Upon being annealed at 850° to 1,100° C. the refractory bricks suffer a shrinkage of 1 to 3 percent whereafter they assume their final shape so that there will be no changes in their dimensions when in use.

Besides aluminum, it is possible to employ other metals which are suitable for diffusion for the purpose of thermochemical diffusion.

The bricks prepared according to the invention will preferably be used in industrial furnaces such as air heaters, Martin furnace grids, gas disintegration and cupola furnaces, annealing and heating furnaces, and the like. The bricks produced by the method according to the invention may likewise be employed in the furnaces of the cement industry such as the rotating drum clinker furnaces, Pallet's process furnaces, melting furnaces of the glass industry, and so on. Moreover, it is possible to employ such bricks also for casting ladles and for complete wall linings of continuously operating foundries, etc.

In view of the foregoing disclosure, therefore, it will be evident that the initially recited object of the present invention has been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A method for improving refractory bricks comprising the steps of:

heating bauxite powder at a rate of 20° to 50° C. per hour to a temperature of 950° to 1,100° C., maintaining said powder at this temperature for 10 to 15 hours, cooling the powder down to room temperature, comminuting the powder and passing the comminuted powder through a sieve having a mesh size of 0.4 to 1 millimeter;

admixing about 40 to 60 percent by weight of said sieved powder with about 60 to 40 percent by weight of powdered aluminum and about 1 to 6 percent by weight of powdered ammonium chloride so as to obtain a homogeneous intermediate powder;

annealing said intermediate powder at a temperature of 950° to 1,100° C. for 22 to 26 hours, cooling down, comminuting and sieving said intermediate powder;

admixing with said sieved powder about 10 to 20 percent by weight powdered aluminum and about 0.5 to 3 percent by weight powdered aluminum chloride;

embedding refractory bricks in the last-mentioned powder to form a thickness layer of said powder of about 20 to 60 millimeters and heating the embedded bricks in an oxygen-free atmosphere at a temperature of 900° to 1,100° C. for 18 to 36 hours.

* * * * *